United States Patent
Baumann et al.

(10) Patent No.: US 6,179,300 B1
(45) Date of Patent: Jan. 30, 2001

(54) TOOL HOLDER

(75) Inventors: Otto Baumann; Sven Kageler, both of Leinfelden-Echterdingen (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/306,071

(22) Filed: May 6, 1999

(30) Foreign Application Priority Data

Jun. 18, 1998 (DE) ............................................. 198 27 172

(51) Int. Cl.$^7$ .......................... B23B 45/16; B23B 31/107
(52) U.S. Cl. .......................... 279/19.4; 279/74; 279/82; 279/29; 279/904
(58) Field of Search ................................ 279/19, 19.4, 74, 279/82, 906, 24, 29, 904

(56) References Cited

U.S. PATENT DOCUMENTS 1,091,886 * 3/1914 Koontz .................................... 279/74

FOREIGN PATENT DOCUMENTS

| 32 05 063 C2 | 10/1986 | (DE) . |
| 35 06 008 C2 | 8/1992 | (DE) . |

* cited by examiner

Primary Examiner—Steven C. Bishop
(74) Attorney, Agent, or Firm—Michael J. Striker (57) ABSTRACT

A tool holder for coupling of rotating and striking tools with hand power tools has a coupling sleeve, a drive member connectable to a hand power tool and transmitting a drive movement, the coupling sleeve being connected with the drive member, a tool shaft provided with groove-shaped locking pockets which are closed at both sides in an axial direction, the coupling sleeve being connected with the tool shaft, elongated locking bodies which are oriented axis-parallel and engage in the locking pockets, the coupling sleeve having a longitudinal passage in which each of the locking bodies are axially displaceable and held radially immovable, a displacement sleeve which surrounds the coupling sleeve with the locking bodies and is spring-loaded in an axial direction, the displacement sleeve having an inner blocking surface which blocks a radial movement of the locking bodies, each of the locking bodies has a construction which is saddle-shaped in a longitudinal section and has two humps which have an arcuate cross-section, are spaced from one another and abut against the blocking surface, a long shaped body which is arranged at a side facing away from the humps and has a region engaging in the locking pocket and a cross-section form-lockingly corresponding to a cross-section of the locking pockets, the blocking surface of the displacement sleeve being provided with a ring groove which allows insertion of one of the humps and has a groove depth which is greater than a radial depth of the locking pockets.

14 Claims, 6 Drawing Sheets

TOOL HOLDER

BACKGROUND OF THE INVENTION

The present invention relates to a tool holder for coupling of rotatable and/or striking tools with hand power tools, in particular with drill hammers or impact hammers.

In a known tool holder disclosed for example in the German patent document DE 32 05 063 C2 the tool shaft has two open driving grooves located at diametrically opposite points and having radial flanks which cooperate with associated surfaces of stripped shape drivers in the receiving opening of the coupling sleeve which receives the tool shaft. Two groove-shaped locking pockets which are closed at both sides in the axial direction are provided on the diagonals which are perpendicular to the diametrical points, on the outer surface of the tool shaft. They are used for axial holding of the tool in the tool holder. The locking bodies engage in the locking pockets and are formed as balls. The balls abut against a flat sheet metal ring which is supported on the displacement sleeve, in the part of the displacement sleeve located in immovable position in which the blocking surface is provided. Therefore, the balls are secured against radial displacement from the blocking pockets. For unlocking the tool, the displacement sleeve is displaced against the spring force so that the balls reach a region of the displacement sleeve located outside of the blocking surface, in which the balls are released for a radial displacement. During removal of the tool shaft from the coupling sleeve, the balls are moved from the locking pockets and the tool shaft is released. During insertion of the tool the end of the tool shaft presses the balls against the sheet metal ring and displaces the same until the balls leave the blocking surface of the displacement sleeve and can deviate radially outwardly, so that the tool shaft can be displaced under the balls. When the locking pockets reach the balls, the balls dig into the locking pockets, and the springs which were tensioned during the insertion step by displacement of the sheet metal ring are displaced under the blocking surface. The tool is thereby axially fixed in the tool holder with a gap in the axial direction.

In another known tool holder disclosed for example in the German patent document DE 35 06 008 C2 the torque transmission from the tool holder to the tool shaft is not performed through special drive grooves in the tool holder, but instead is performed through locking pockets. For this purpose the locking body engages the longitudinally extending cylindrical rollers which engage form-lockingly in the locking pockets with closed end sides, and the tool shaft is fixed both in the axial direction as well as in the rotary direction in the coupling sleeve. For removing the cylindrical rollers from the locking pockets, the displacement path in the displacement sleeve must be greater than the length of the cylindrical rollers, which must be as long as possible for transmission of a great torque. In order to shorten the displacement path, each locking body which is formed of two parts has a sliding block with an abutment projection near the cylinder roller. The blocking surface of the sliding sleeve is stepped and provided with two radially offset control surfaces, which cooperate also with two radially stepped surface portions of the periphery of the sliding block. The sliding block is located on the associated cylindrical roller and over engages with its radial abutment projections the end side of the cylinder roller which is located behind in the insertion direction of the tool shaft. A pressure spring which acts against the insertion direction of the tool shaft loads the sliding block in an axial direction and presses it against an abutment on the displacement sleeve.

SUMMARY OF THE INVENTION

Accordingly, it is an object of the present invention to provide a tool holder, which avoids the disadvantages of the prior art.

In keeping with these objects and with others which will become apparent hereinafter, one feature of present invention resides, briefly stated, in a tool holder in which each locking body in a longitudinal section has a saddle construction with two humps which are spaced from one another, abut against the blocking surface and have an arcuate cross-section, and with a long shaped body which extends at the side facing away from the hump and has a region inserted in the locking pocket and having a cross-section which form-lockingly corresponds to the cross-section of the locking pocket, and the locking surface of the displacement sleeve has at least one ring groove which allows the insertion of a hump and is formed with a groove depth which is greater than a radial depth of the locking pockets.

When the tool holder is designed in accordance with the present invention, the locking pockets are used for increased torque transmission, the displacement sleeve for its simple handling requires during an axial unlocking actuation a small displacement path of several millimeters for the tool unlocking, and despite this the locking bodies have a design which provides their simple manufacture.

The locking bodies are composed of a single part and have a symmetrical construction, which increases the manufacturing and mounting safety. The contact surfaces between the locking bodies and the blocking surface on the displacement sleeve can be made very small by the corresponding design of the hump in the axial direction and reduced to a line. This makes possible a low-friction free rotation of the displacement sleeve relative to the coupling sleeve in the event of an end-side wall contact, which substantially increases the safety in the handling of the power tool.

In accordance with a preferable embodiment of the invention, the flanks of the saddle surface which connects one hump to the other in the locking body has a definite flank angle, and the groove flanks are provided with at least one ring groove with a same flank angle. A radially outwardly arranged incline is formed at both ends of the blocking surface and extends at a same angle of the hump flanks. During locking and unlocking of the tool, a hump flank of the locking body comes to abutment with a groove flank or an incline of the blocking surface. Due to these flanks which abut against one another, the blocking body during unlocking and locking step turns around one hump definitely, whereby a tilting of the locking body and a resulting poor availability during insertion and withdrawal of the tool from the tool holder is avoided.

In accordance with a further preferable embodiment of the invention, the blocking surface of the displacement sleeve at its rear end as considered in the insertion direction of the tool shaft is limited by an axially displaceable ring-shaped holding disk. The holding disk engages with a radially inwardly projecting holding projection into a longitudinal passage in the coupling sleeve and abuts by a locking spring with a pressure force opposite to the insertion direction of the tool shaft against a radial shoulder of the displacement sleeve formed on the end of the blocking surface. This blocking sleeve guarantees the automatic return of the locking body to the locking position after a complete insertion of the tool shaft into the coupling sleeve.

In accordance with a preferable embodiment of the invention, the holding disk is composed of a springy material, for example a spring metal sheet and the holding projections are cut from the disk ring by at least one slot so that they can spring in the axial direction opposite to the disk plane. With such a holding disk which is supported by the locking spring between the displacement sleeve and the coupling sleeve, the pressure spring for axial spring loading of the displacement sleeve can be dispensed with, since the holding metal sheet of the locking sleeve takes over the both different return functions for the disk sleeve and the locking body, without releasing a similarly oriented displacement movement of the displacement sleeve during the axial displacement of the locking body released by insertion of the tool shaft into the coupling sleeve, so that the relative movement of the locking body and the blocking surface is reliably secured. The removal of the return spring of the displacement sleeve is not only favorable in view of the manufacturing cost, in particular the part and mounting cost, but is also favorable in view of the structural size of the tool holder, since the diameter of the displacement sleeve can be made smaller.

The spring action of the holding projections relative to the disk ring can be realized by different slots. In one embodiment of the invention, the projections extend correspondingly through two parallel slots which extend parallel to the radial direction of the holding disk, separated from the disk ring, and connected only at the projection root with the disk ring. In an alternative embodiment of the invention, the projections each extend through a slot which is parallel to the radial direction and extends into an arcuate slot which is arranged concentrically in the disk ring, separately from the disk ring.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENT

Figure 1:
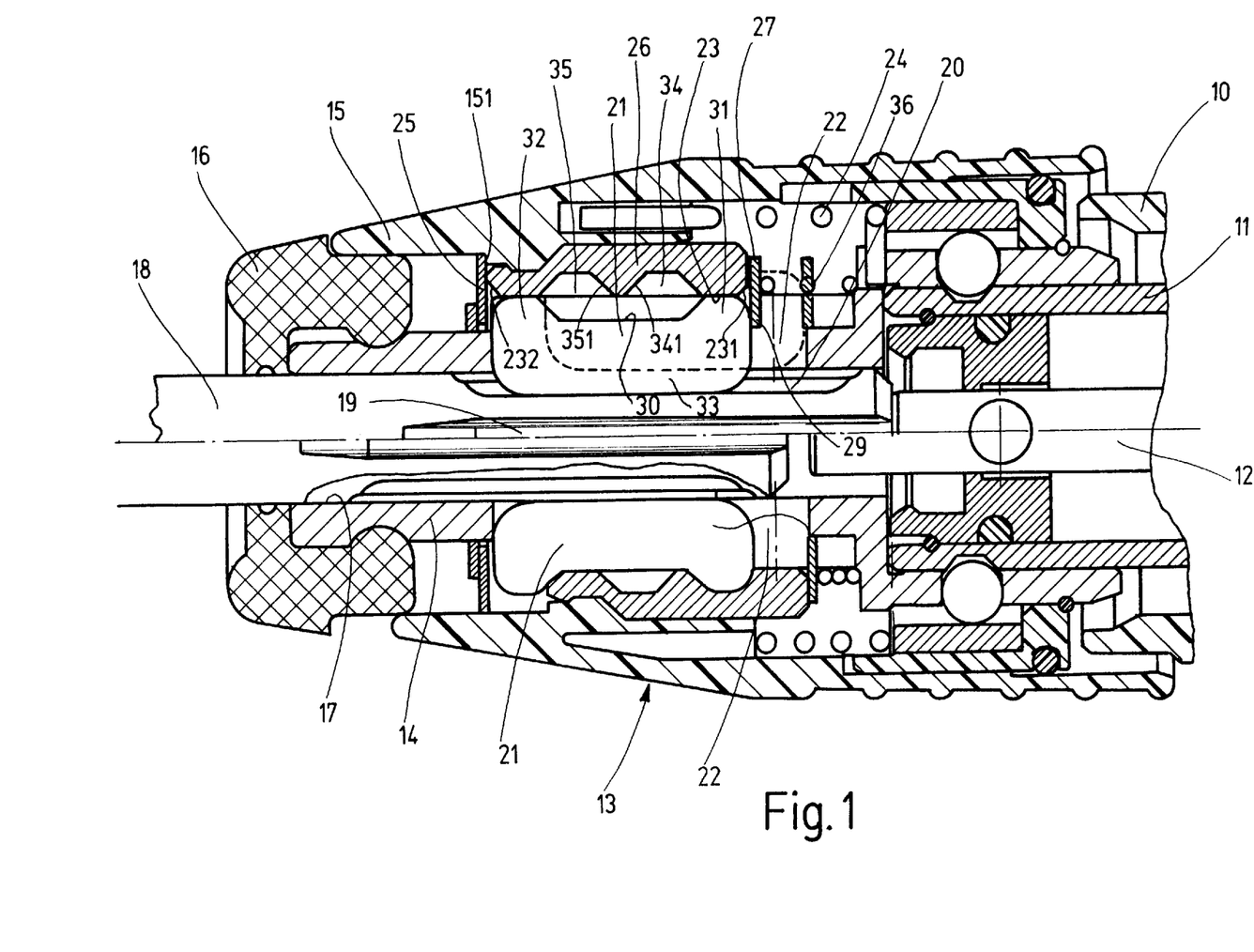
FIG. 1 is a view showing a longitudinal section of a tool holder which is arranged on a drive member of a drill hammer.

FIG. 1 illustrates, from a hammer drill which is not shown in detail, only its front drive member 11 which extends from a stationary housing 10 and activates a rotary drive, as well as an inner drive member 12 which realizes the axial abutment. The tool holder is identified with reference numeral 13 and is releasably arranged on the hammer drill. It has a coupling sleeve 14 which is non-rotatably connected with the drive member 11, a displacement sleeve 15 which surrounds the coupling sleeve 14 and is displaceable relative to it, and a protective cap 16 which is fixed on the front end of the coupling sleeve 14 axially displaceably and is partially engaged by the displacement sleeve 15. The coupling sleeve 14 is provided in its interior with a throughgoing cylindrical receiving opening 17, in which a tool shaft 18 of a tool, such as for example a drill is insertable.

Figures 2, 3, 4, 5:
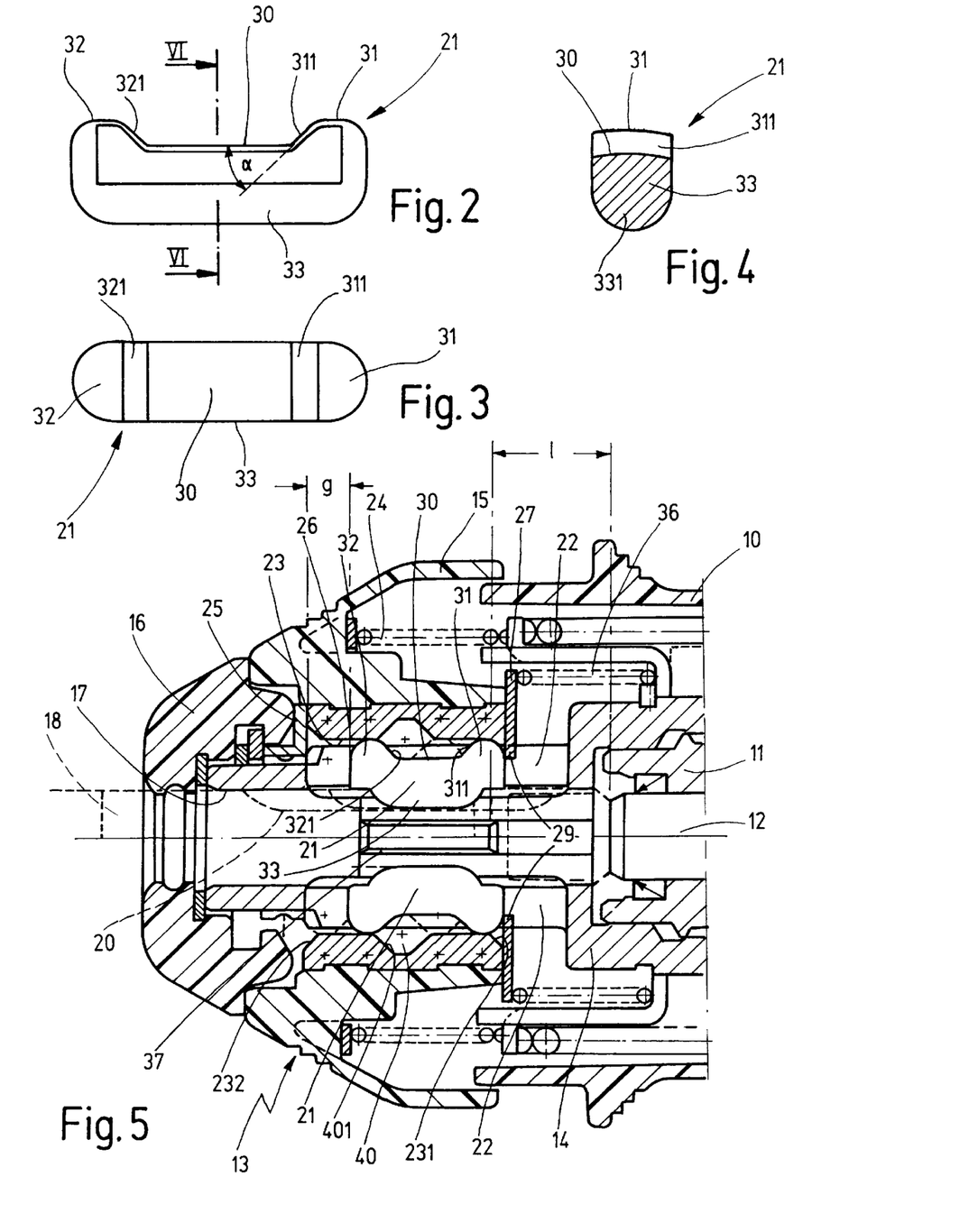
FIG. 2 is a side view of a locking body in the tool holder of FIG. 1.
FIG. 3 is a plan view of the locking body in FIG. 2.
FIG. 4 is a view showing a section taken along the line IV—IV in FIG. 2.
FIG. 5 is a view substantially corresponding to the FIG. 1, but showing a modified tool holder.

The tool shaft 15 of the tool which is shown in FIG. 1 in two different insertion positions has at its rear end a flat abutment surface provided with a chamfer and axially striking the facing abutment surface of the drive member 12. Therefore the axial impacts are transmitted. Two open driver grooves 19 are arranged on the outer peripheral surface of the tool shaft 18 at diametrical points and are open at the end of the tool shaft 18. Only one driver groove 19 is shown in FIG. 1. The approximately radial flanks of the rotary grooves 19 cooperate with associated surfaces of the strip-shaped drivers 37 which are shown in FIG. 5 and provided in the receiving opening 17 of the coupling sleeve 14. The torque of the coupling sleeve 14 is transmitted to the tool shaft 18 through the drivers 37 inserted in the driver grooves 19.

The tool shaft 18 at diametrical points of the tool shaft which are offset by 90° relative to the driver grooves 19, is provided with two groove-shaped locking pockets 20. The locking pockets are closed in the axial direction and two longitudinally extending locking bodies 21 form-locking engage in the locking pockets. The locking pockets 21 are held in longitudinal passages 22 in the coupling sleeve 14. The longitudinal passages 22 narrow radially inwardly so that the respective blocking bodies 21 can not fall out inwardly. The locking bodies 21 are axially displaceable and radially displaceable in the longitudinal passages 22. Their radial displaceability is blocked by a blocking surface 23 which is formed on the displacement sleeve 15, when the displacement sleeve is located in its basic position as shown in the upper half of FIG. 1. In this basic position the displacement sleeve 15 is held by a pressure spring 24.

The pressure spring 24 abuts at the one side against the coupling sleeve 14 and at the other side against the displacement sleeve 15. The displacement sleeve 15 with a ring shoulder 151 formed on it presses against an abutment 25 which is fixed on the coupling sleeve 14. In the embodiment shown in FIG. 1, the blocking surface 23 is not formed directly on the displacement sleeve 15, but instead it is formed on a separate running ring 26. The running ring is connected with the displacement sleeve 15 so that it is taken along by the displacement sleeve 15 during its axial displacement. At the end of the running ring 26 as considered in the insertion direction of the tool shaft 18, a holding disk 27 is pressed by a locking spring 36 which is supported on the coupling sleeve 14. The holding disk 27 carries two inwardly radially projecting holding projections 29 at the diametrical points. They each extend in one longitudinal passage 22 and are axially displaceably guided in it.

Both longitudinal extending locking bodies 21 are formed symmetrically and each have in a longitudinal section a saddle-shaped design with two humps 31 and 32 and with a saddle surface 30 there between. The humps are spaced from one another and have an arcuate cross-section. The flanks 311 and 321 which extend from the humps 31 and 32 to the saddle surface 30 have a same, defined flank angle α shown in FIG. 2. A longitudinally extending shape body 33 is formed on the blocking body 21 at the side facing away from the humps. Its region 331 which engages in the locking pocket 20 has a cross-section which form-lockingly corresponds to the cross-section of the blocking pocket 20.

The longitudinally extending shaped body 33 makes possible a torque transmission from the coupling sleeve 14 to the tool shaft 18. It forms with the construction of the locking pocket 20 which is closed at the end sides, an axial holder for the tool shaft 18. This axial holder allows a limited axial movement of the tool shaft 18 in the receiving opening 17 of the coupling sleeve 18. In the locking position of the locking body 21, which is shown in the upper half of FIG. 1, each shaped body 32 is located with its region 331 in the associated locking pocket 20 in a form-locking manner. It is supported with its both humps 31, 32 against the blocking surface 21 of the running ring 26. Therefore, both locking members 21 can not move in the radial direction.

In order to provide a radial gap of both locking members 21 which is needed for the tool exchange, in the embodiment of FIG. 1, two parallel ring grooves 34, 35 are formed in the blocking surface 23. They have a groove depth which is greater than the radial depth of the locking pockets 20. The distance between two ring grooves 34 and 35 is selected so that during insertion of the tool shaft 18 in the receiving openings 17 of the coupling sleeve 14, the front hump 32 can engage in the front ring groove 31 as considered in the insertion direction and during withdrawal of the tool shaft 18 from the coupling sleeve 14, the rear hump 31 can engage in the rear ring groove 34. The groove flanks 341 and 351 of both ring grooves 34, 35 have the same flank angle. The same is true with respect to the hump flanks 311 and 321. The length of the blocking surface 23 and thereby the length of the running ring 26 and the length of both ring grooves 34, 33 are determined relative to one another so that always when one hump 31, 32 engages in one ring groove 34, 35, the other hump 32, 31 is located outside the blocking surface 23 over the running ring 26. Additionally, the blocking surface 23 is inclined at both ends to the running ring 26. The ring-shaped inclines which are identified in FIG. 1 with reference numerals 231 and 232 have an inclination angle which corresponds to the flank angle of the hump flanks 311 and 321.

A tool clamped in the tool holder 13 is automatically locked in the tool holder by the insertion of the tool shaft 18 into the receiving opening 17 of the coupling sleeve 14. The locking bodies 21 in FIG. 1 are displaced by the end surface of the tool shaft 18 to the right, and the holding disk 27 is displaced also to the right with compression of the locking spring 36. The hump 32 which is located forwardly in the insertion direction of the tool shaft 18 reaches the region of the ring groove 35 and is pressed by the tool shaft 18 into the ring groove 35, while the hump flank 321 abuts against the groove flank 351. Thereby, now each locking body 21 is turned definitely around its hump 32, and a rear hump 31 abuts with the hump flank 311 against the incline 231. When the tool holder 13 is displaced back under the locking bodies 21, the locking pockets 21 are located in the region of the locking body 21, so that the locking body 21 is displaced by the tensioned locking spring 36 over the incline 231 and the groove flank 351 in the ring groove 35 in the radial direction. It engages with its shaped bodies 33 formed-lockingly into the locking pockets 20. At the front end abutment of the locking body 21, the humps 31, 32 again abut against the blocking surface 23, and the locking bodies 21 are blocked against a radial displacement. When the tool shaft 18 is pulled out, then the tool shaft moves over the rear end of the locking pocket 21 of the hump 31 radially into the rear link groove 34. The hump flank 311 abuts against the groove length 341 again and forms a guide for the locking member 21 during a further upward turning of the locking body 21 by the tool shaft 18. The moving out tool shaft 18 turns the hump 32 outwardly, and the hump flank 321 abuts against the incline 323 of the blocking surface 21. Due to the guidance of the locking body 21 on the groove flank 341 of the ring groove 34, the locking member 21 during upward turning of the front hump 32 is not tilted, so that the unlocking process is very easy and there is no clamping risk. With the withdrawn tool shaft 18, the displacement sleeve 15 is released. The clamped locking spring 36 presses the locking body 21 radially inwardly through the holding disk 27 and the running ring 26. Due to the groove flank 341 of the groove 34, the incline 332 of the blocking surface 32 and the hump flanks 311 and 321, the radial movement of the locking body is performed. The locking body 21 and the displacement sleeve 15 assume finally the basic position shown in the upper half of FIG. 1 when there is no tool shaft 18.

In the alternative embodiment, the both ring grooves 34 and 35 can be united to a single longitudinally-extending ring groove. For this purpose, the intermediately located part of the running ring 26 or the blocking surface 23 is removed. Since, however, the groove flanks 341 and 351 which face one another are no longer provided, the guidance for turning of the locking body 21 around its hump 31, 32 is also absent. Therefore, the unlocking and locking processes during a tool exchange are somewhat difficult.

In the tool holder 13 in accordance with another embodiment shown in FIG. 5, the running ring 26 with the blocking surface 23 is modified so that only a single ring groove 40 is provided for insertion of both humps 31 and 32 of the locking body 21. During unlocking and locking processes both humps 31, 32 engage in the same ring groove 40. Therefore, the same turning of the locking body 21 takes place, which guarantees the easiness of the tool exchange. In remaining aspects, the components of the tool holder correspond to the components of the tool holder of FIG. 1 so that the same reference numerals are used here. The locking bodies 21 are formed somewhat shorter axially and engage with a part of their axial length in the locking pockets 20. The humps 31, 32 which fall down via flat hump flanks 311 and 321 to the saddle surface 30, have a semi-circular contour in a longitudinal section. Thereby the contact surfaces between the locking bodies 21 and the blocking surfaces 23 on the displacement sleeve 15 are very small and reduce only to a line. Thereby the low-friction free turning of the displacement sleeve 15 relative to the coupling sleeve 14 is performed in the case of an end-side wall contact. The groove flanks 401 of the ring groove 40 have the same flank angle as the hump flanks 311 and 321. The running disk 26 with the blocking surface 23 is formed axially longer than the locking body 21, and the ring groove 40 is placed so that during engagement of one of the both humps 31, 32 in the ring groove 40 the other of the humps 31, 32 is located outside of the blocking surface 23 or the running ring 26.

The running ring 26 is provided at an end side with circumferential inclines 231 and 232 which limit the blocking surface 23. Their inclined angle corresponds to the flank angle of the hump flanks 311, 321. In other aspects the construction and the operation of the tool holder 13 of FIG. 5 corresponds to those of the tool holder 13 of FIG. 1. The axial length of the locking bodies 21 is normally provided by the length of the locking pocket 20, less idle running path of the hammer drill or the tool shaft 18. In order to increase the length of the locking body 21, a basic gap must be provided and the locking body must engage only with a part of its total length into the locking pocket 20. The basic gap of the locking body 21 is identified in FIG. 1 with g. The basic gap g is determined from the length of the locking pocket 21 less the axial length of the part of the locking body 21 engaging in the locking pocket 20 and less the idle running path I of the drive member 12 of the hammer drill or the tool shaft 18. Simultaneously, the basic gap g is the axial measure of the portion of the blocking surface 23 located at both sides near the ring groove 40.

Figure 6:
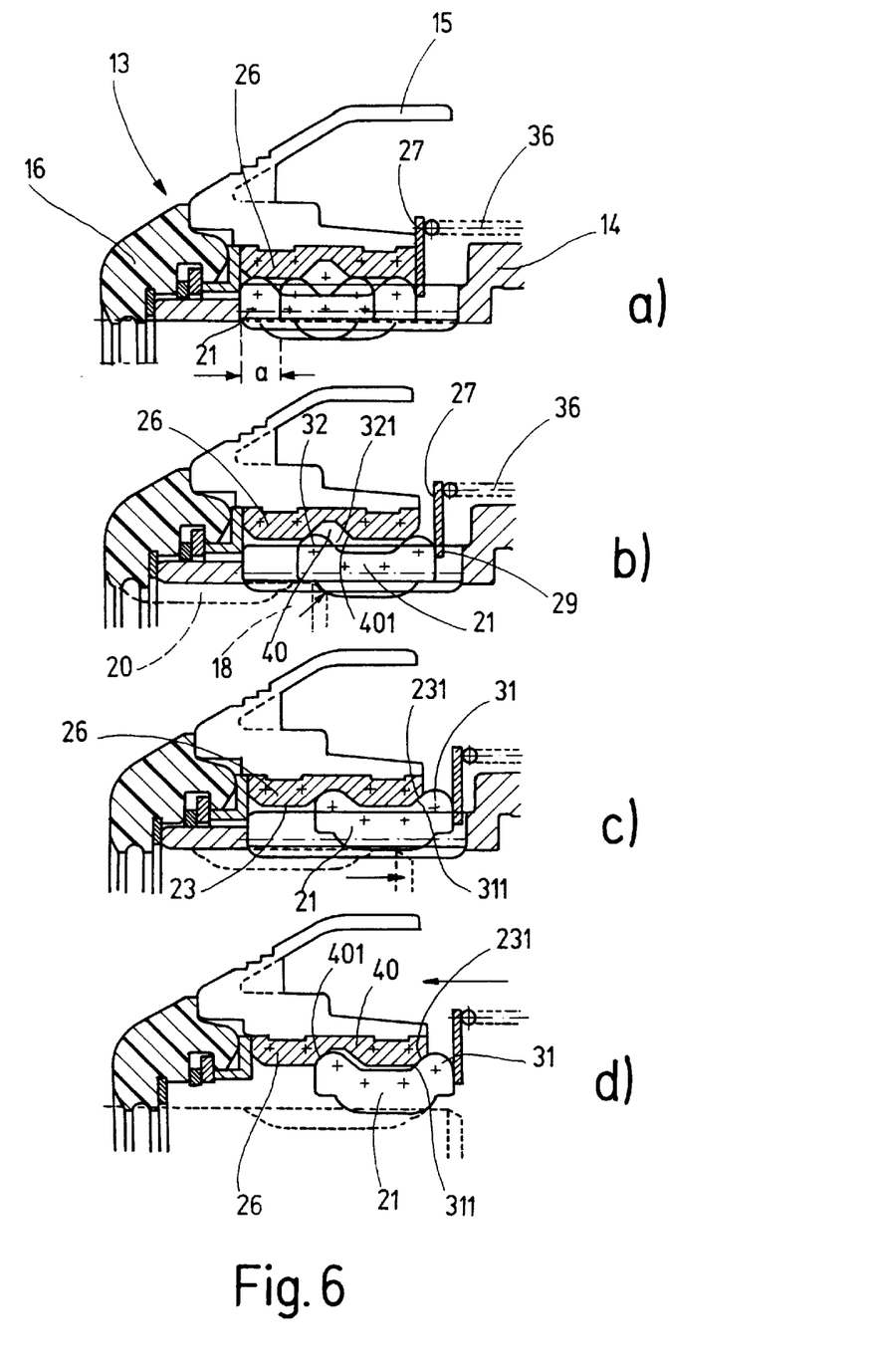
FIG. 6 is a section substantially corresponding to the view of FIG. 5 for demonstration of the locking process during a tool exchange.

FIG. 6 shows the blocking process during insertion of a tool shaft 18 into the receiving opening 17 of a coupling sleeve 14 in four different stages. In FIG. 6a, the empty tool holder 13 is sketched. The locking body 21 can perform the idle path a under the blocking surface 23 without leaving it. With the clamped tool, the locked position of the locking body 21 shown in FIG. 6a corresponds to the idle running operation and the right position of the locking body 21 corresponds to the working operation. When the tool shaft 18 is inserted in the coupling sleeve 14, its shaft end displaces the locking member 21 in correspondence with FIG. 6b. The holding disk 27 is displaced back and the locking spring 26 is tensioned. The hump 32 engages in the ring groove 40 and is located with its hump flank 321 on the right groove flank 401 of the ring groove 40. During a further displacement of the tool shaft 18 the locking member 27 is turned outwardly around the hump 32 located in the ring groove 40, and the flanks 321 and 401 located in one another form a guide which prevents the tilting of the locking body 21 during turning. In FIG. 6 the turning process is completed, and the hump 31 is located with its hump flank 321 against the incline tool 231 of the running ring 26. When now the tool shaft 18 is displaced further, the locking pocket 20 is located under the locking body 21. Thereby the radial displacement of the locking body 21 is performed by the axial pressure of the compressed locking spring 36 acting on the locking body 21, through the inclined 231, the groove flank 401 of the ring groove 40 and the hump flank 311 of the hump 31. The locking body 21 engages with its shaped body 33 into the locking pocket 20 and is transferred by the locking spring 36 to the basic position shown in FIG. 6a. In this position the humps 31, 32 abut against the blocking surface 23 at a radial movement of the locking body 31 is blocked. The tool shaft 18 is fixed in the tool holder 13 with an axial gap, and therefore a torque transmission is performed through the locking body 21 from the rotating coupling sleeve 14 to the tool shaft 18.

Figure 7:
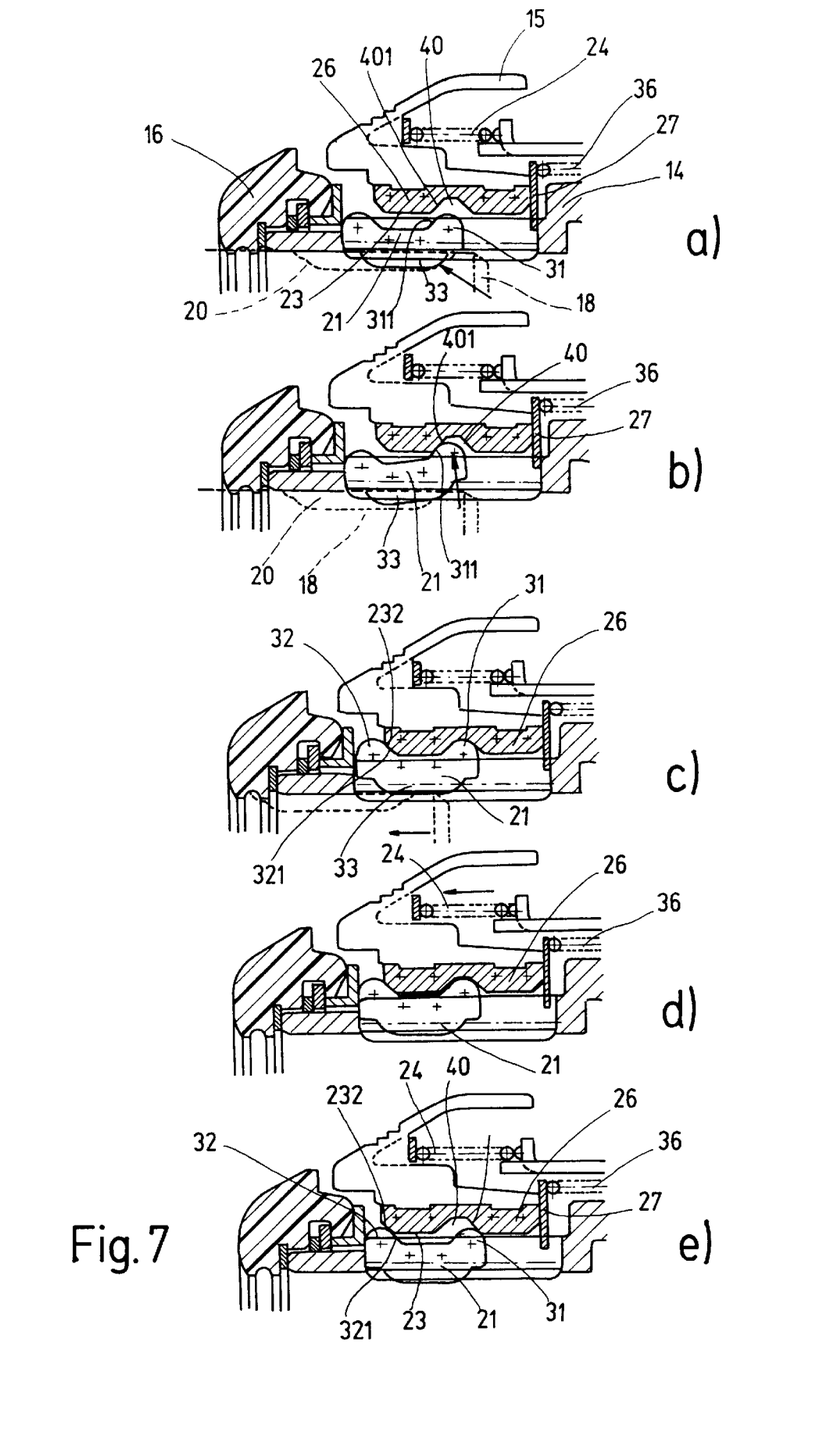
FIG. 7 is a view corresponding to the view of FIG. 5 for demonstration of the unlocking process during the tool exchange.

FIG. 7 shows the unlocking process for exchanging a tool in five different stages. In 7a, the displacement sleeve 15 is guided back against the pressure spring 24 in its unlocking position, whereby the running ring 26 is displaced so that the ring groove 40 is located over the hump 41. When the tool shaft 18 is pulled out, then with striking of the shaped body 33 on the closed end of the locking pocket 20, the hump 31 is pressed into the ring groove 40 and abuts with its hump flank 311 against the groove flank 401 as shown in FIG. 7b. During a further pulling of the tool shaft 18, the locking body 21 turns around the hump 31 inserted in the ring groove 40. The hump 32 is therefore turned upwardly and abuts with its hump flank 321 against the incline 332 of the running ring 26 (FIG. 7c). When the tool shaft 18 is pulled under the locking member 21 and the displacement sleeve 15 is released, then due to the axial force of the clamped pressure spring 24 and the clamped locking spring 26, the displacement sleeve 15 is displaced back with the running ring 26 to its basic position. Radial force component is applied to the locking body 21 through the incline 332 and the hump flank 321 as well as the groove flank 401 and the hump flank 311. It displaces the locking body 21 radially, so that the blocking surface 23 can slide in over both humps 31, 32 as shown in FIG. 7e. FIGS. 6 and 7 clearly show that both during the locking process and the unlocking process, the corresponding hump 31 and 32 engaging in the ring groove 40 forms a guide for turning of the locking body 21, so as to prevent tilting of the long locking 21 and therefore to make the process of tool exchange very easily accessible.

Figure 8:
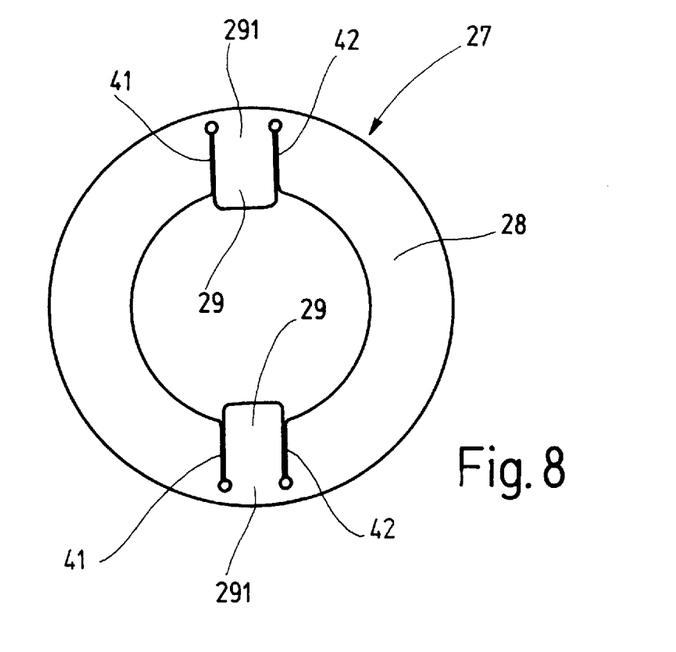
FIGS. 8 and 9 show a plan view of the holding disk in the tool holder of FIG. 5, in two different embodiments.
Figure 9:
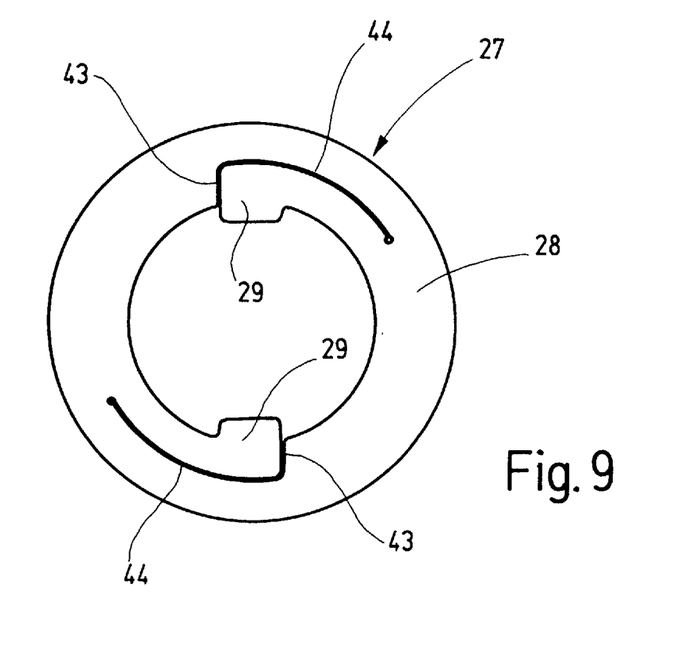

FIGS. 8 and 9 show a modified holding disk 27 which can be inserted as the holding disk 27 in the tool holder 13 in correspondence with FIGS. 1 and 2. As before, the holding disk 27 has a disk ring 28 with two radially inwardly projecting holding projections 29, which is engaged in the longitudinal passages 22 of the coupling sleeve 14 and thereby the holding disk 27 is axially displaceable fixed on the coupling sleeve 14. The holding disk 27 is composed of a springy material, for example the spring metal plate. The holding projections 29 are freely cut by at least one slot from the disk ring 28 so that they can spring relative to the disk plane in the axial direction. In the embodiment shown in FIG. 8, the holding projections 29 are separated from the disk ring 28 by two parallel slots 41, 42 which extend parallel to the radial direction of the holding direction 27. Therefore, they are connected only on their projection root 291 with the disk ring 28. In the embodiment of FIG. 9, each projection 29 is separated from the disk ring 28 by a slot 43 which extends parallel to the radial direction and an extending slot 44 which extends substantially centrally in the disk ring 28 in the longitudinal direction, concentrically to the disk axis. A holding disk in accordance with FIGS. 8 and 9 is inserted partially in FIG. 10 into the tool holder 13. The tool holder 13 is different from the tool holder of FIG. 5 in that the pressure spring for return of the displacement sleeve 15 is dispensed with. Its function are performed by the structural design of the holding disk 27, by the locking spring 26. The components of the tool holder 13 in FIG. 10 substantially corresponds to components of the tool holder of FIG. 5 and identified with the same reference numeral numerals.

Figure 10:
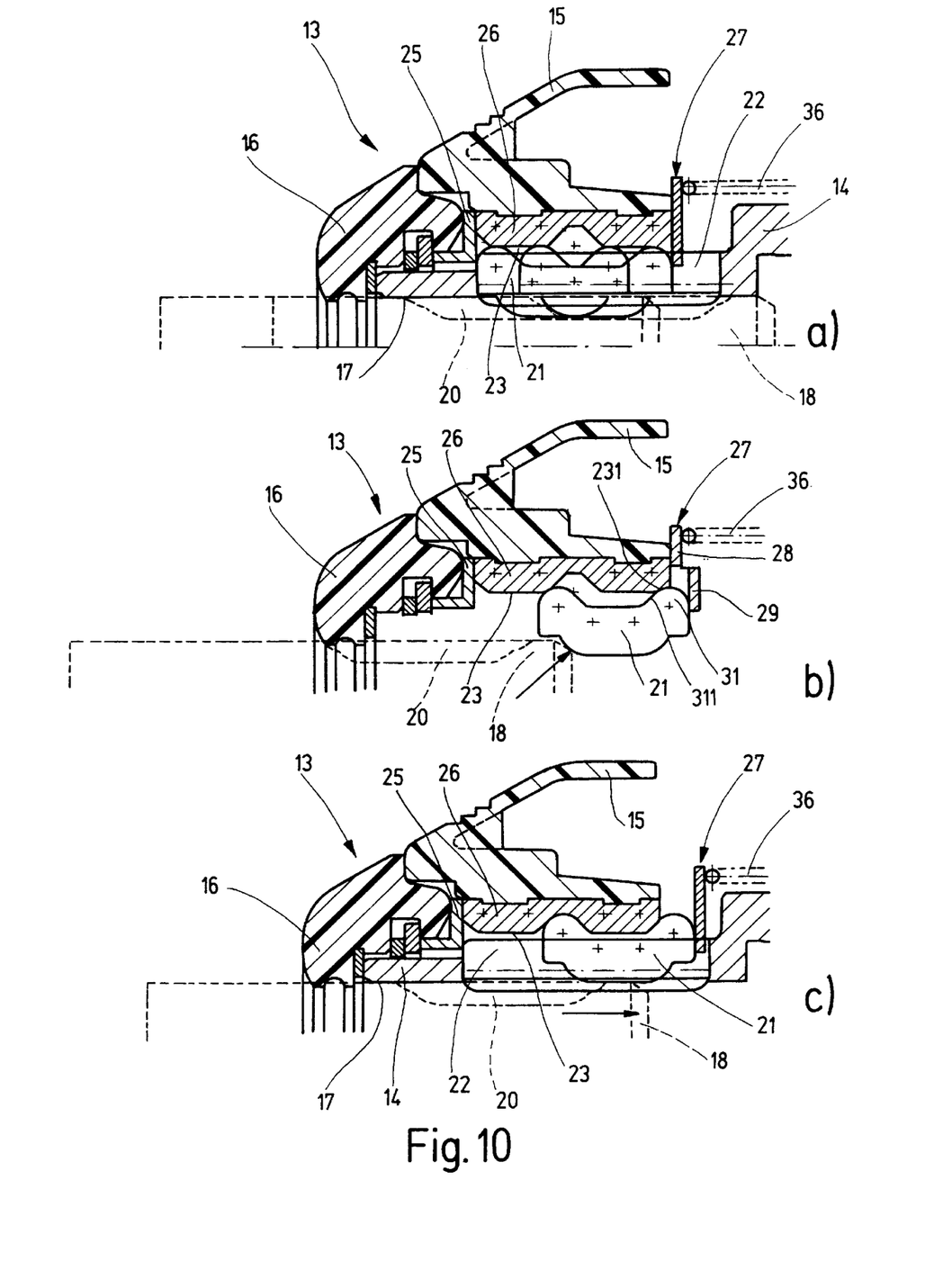
FIG. 10 is a view showing a section corresponding to the view of FIG. 5 for demonstration of the operation of the holding disk of FIGS. 8 or 9 during locking of a tool insertable in the tool holder.

In FIG. 10a the tool holder 13 is shown in its basic position with the inserted tool shaft 18. The tool shaft 18 is non rotatably held in the coupling sleeve 14 through the locking body 21 which is form-lockingly inserted in the locking pocket 20 and is secured from axial falling out. In FIGS. 10b and 10c, the operation of the spring disk 27 of FIGS. 8 and 9 during a tool exchange is illustrated, and in particular during insertion of the tool shaft 18 into the coupling sleeve 18. During insertion of the tool shaft 18 the locking body 21 displaces in FIG. 10 to the right against the holding disk 27. During a further displacement of the locking body 21 first the springy displacement projections 29 are moved, while the disk ring 28 remains pressed by the locking spring 36 against the running ring 26 and the displacement sleeve 15, so that the later maintains its basic position. This is shown in FIG. 10b.

After a spring path of approximately 1–1.5 mm, the disk ring 28 moves under tensioning of the locking spring 36. Since the hump 31 of the locking member 21 has been already inserted between the holding projection 29 and the incline 231 on the running ring 26, the running ring 26 and thereby the displacement sleeve 15 is held in their position with the remote disk ring 28 of the holding disk 27. During a further displacement of the holding disk 27 against the force of the locking spring 36, the hump 31 turns upwardly and abuts with its hump surface 311 against the inclined 231, so that now the locking members 21 are lifted so far that the tool shaft 18 can be completely inserted in the coupling sleeve 14. In this position the disk ring 28 and the holding projection 29 are located in the same disk plane, since the locking member 21 abuts both against the holding projection 29 and the disk ring 28. As described herein above, from this unlocking position, the locking member 21 is guided back by the spring force of the tensioned locking spring 36 to its locking position shown in FIG. 10a, in which the humps 31, 32 of the locking body 21 abut against the blocking surface 23 and secured against the radial displacement.

It will be understood that each of the elements described above, or two or more together, may also find a useful application in other types of constructions differing from the types described above.

While the invention has been illustrated and described as embodied in tool holder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tool holder for coupling of rotating and striking tools with hand power tools, comprising a coupling sleeve; a drive member connectable to a hand power tool and transmitting a drive movement, said coupling sleeve being connected with said drive member; a tool shaft provided with groove-shaped locking pockets which are closed at both sides in an axial direction, said coupling sleeve being connected with said tool shaft; elongated locking bodies which are oriented axis-parallel and engage in said locking pockets, said coupling sleeve having a longitudinal passage in which each of said locking bodies are axially displaceable and held radially movable; a displacement sleeve which surrounds said coupling sleeve with said locking bodies and is spring-loaded in an axial direction, said displacement sleeve having an inner blocking surface which blocks a radial movement of said locking bodies, each of said locking bodies has a construction which is saddle-shaped in a longitudinal section and has two humps which have an arcuate cross-section, are spaced from one another and abut against said blocking surface; a long, shaped body which is arranged at a side facing away from said humps and has a region engaging in said locking pocket and a cross-section form-lockingly corresponding to a cross-section of said locking pockets, said blocking surface of said displacement sleeve being provided with a ring groove which allows insertion of one of said humps and has a groove depth which is greater than a radial depth of said locking pockets.

2. A tool holder as defined in claim 1, wherein a length of said blocking bodies, an axial length of said blocking surface and a position of said ring groove are determined relative to one another so that during insertion of one of said humps into said ring groove the other of said humps is located outside of said blocking surface.

3. A tool holder as defined in claim 1, wherein an axial length of said locking bodies is determined so that locking body inside said longitudinal passage in said coupling sleeve has a base gap for an axial displacement, which is determined from an axial length of said locking pockets less an axial length of a part of said locking body engaging in said locking pockets and less an idle path of said tool shaft.

4. A tool holder as defined in claim 1, wherein said humps are connected with one another by a saddle surface having flanks with a flank angle, at least one of said ring grooves having groove flanks which have an angle corresponding to said flank angle.

5. A tool holder as defined in claim 4, wherein each end of said blocking surface has a radially outwardly arranged incline with an inclination angle corresponding to said flank angle.

6. A tool holder as defined in claim 1, wherein said blocking surface has a second ring groove, said ring grooves extending parallel to one another and being spaced from one another so that during insertion of said tool shaft into said coupling sleeve one of said humps engages in a front one of said ring grooves as considered in an insertion direction and during withdrawal of said tool shaft from said coupling sleeve, the other of said humps engages in a rear one of said ring grooves as considered in the insertion direction.

7. A tool holder as defined in claim 1, and further comprising a pressure spring which loads said displacement sleeve against an insertion direction of said tool shaft in said coupling sleeve, said pressure spring being supported between said displacement sleeve and said coupling sleeve, said displacement sleeve abutting against an abutment on said coupling sleeve.

8. A tool holder for coupling of rotating and striking tools with hand power tools, comprising a coupling sleeve; a drive member connectable to a hand power tool and transmitting a drive movement, said coupling sleeve being connected with said drive member; a tool shaft provided with groove-shaped locking pockets which are closed at both sides in an axial direction, said coupling sleeve being connected with said tool shaft; elongated locking bodies which are oriented axis-parallel and engage in said locking pockets, said coupling sleeve having a longitudinal passage in which each of said locking bodies are axially displaceable and held radially movable; a displacement sleeve which surrounds said coupling sleeve with said locking bodies and is spring-loaded in an axial direction, said displacement sleeve having an inner blocking surface which blocks a radial movement of said locking bodies, each of said locking bodies having a construction which is saddle-shaped in a longitudinal section and has two humps which have an arcuate cross-section, are spaced from one another and abut against said blocking surface; a long, shaped body which is arranged at a side facing away from said humps and has a region engaging in said locking pocket and a cross-section form-lockingly corresponding to a cross-section of said locking pockets, said blocking surface of said displacement sleeve being provided with a ring groove which allows insertion of one of said humps and has a groove depth which is greater than a radial depth of said locking pockets; an axially displaceable, ring-shaped holding disk which limits said blocking surface of said displacement disk at a rear end as considered in an insertion direction of said tool shaft, said holding disk engaging with a radially inwardly extending holding projections into said longitudinal passage of said coupling sleeve; and further comprising a locking spring providing a force which is opposite to said insertion direction of said tool shaft and forces said holding disk against a radial shoulder of said displacement sleeve which is formed at an end of said blocking surface.

9. A tool holder as defined in claim 8, wherein said holding disk is composed of a springy material and said holding projections are formed by a cut from said disk ring by at least one slot so that it can spring relative to a disk plane in an axial direction.

10. A tool holder as defined in claim 9, wherein said holding projections are separated from said disk ring by correspondingly two parallel slots extending parallel to a radial direction of said holding sleeve.

11. A tool holder as defined in claim 9, wherein said holding projections are separated from the disk ring by correspondingly a slot extending parallel to a radial direction of said holding disk and an arcuate slot extending concentrically to the first mentioned slot and extending directly from the latter concentrically to said disk ring.

12. A tool holder as defined in claim 11, wherein said arcuate slot extend at diametrical points centrally in said disk ring.

13. A tool holder for coupling of rotating and striking tools with hand power tools, comprising a coupling sleeve; a drive member connectable to a hand power tool in transmitting a drive movement, said coupling sleeve being connected with said drive member; a tool shaft provided with groove-shaped locking pockets which are closed at both sides in an axial direction, said coupling sleeve being connected with said tool shaft; elongated locking bodies which are oriented axis-parallel and engage in said locking pockets, said coupling sleeve having a longitudinal passage in which each of said locking bodies are axially displaceable and held radially movable; a displacement sleeve which surrounds said coupling sleeve with said locking bodies and is spring-loaded in an axial direction, said displacement sleeve having an inner blocking surface which blocks a radial movement of said locking bodies, each of said locking bodies having a construction which is saddle-shaped in a longitudinal section and has two humps which have an arcuate cross-section, are spaced from one another and abut against said blocking surface; a long, shaped body which is arranged at a side facing away from said humps and has a region engaging in said locking pocket and a cross-section form-lockingly corresponding to a cross-section of said locking pockets, said blocking surface of said displacement sleeve being provided with a ring groove which allows insertion of one of said humps and has a groove depth which is greater than a radial depth of said locking pockets, said blocking surface being formed on a running disk which is connected with said displacement sleeve so that said running disk during an axial displacement of said displacement sleeve is driven without gap by the latter, said blocking surface and said running disk having identical axial lengths.

14. A tool holder as defined in claim 13; and further comprising a locking spring which is formed as a pressure spring and is supported between said coupling sleeve and said holding disk, said running ring abutting through said holding disk against an abutment on said coupling sleeve.

* * * * *